L. A. GREENE.
SOIL BREAKING AND PULVERIZING MACHINE.
APPLICATION FILED AUG. 16, 1917.

1,333,543.  Patented Mar. 9, 1920.

LEMUEL A. GREENE,
INVENTOR

WITNESSES

ATTORNEYS

UNITED STATES PATENT OFFICE.

LEMUEL A. GREENE, OF GREENVILLE, SOUTH CAROLINA.

SOIL BREAKING AND PULVERIZING MACHINE.

1,333,543.  Specification of Letters Patent.  Patented Mar. 9, 1920.

Application filed August 16, 1917. Serial No. 186,541.

*To all whom it may concern:*

Be it known that I, LEMUEL AUSTIN GREENE, a citizen of the United States, and a resident of Greenville, in the county of Greenville and State of South Carolina, have invented certain new and useful Improvements in Soil Breaking and Pulverizing Machines, of which the following is a specification.

My invention is an improvement in soil breaking and pulverizing machines of the type designed to be drawn over the field by motive force and having a plurality of cultivating implements attached and drawn thereby, one of which, in addition to its action in breaking and pulverizing the soil, acts also as a drag to control the depth of the cutting of the implements and wherein, in addition to their action in breaking and cultivating the soil, they act also to propel the machine.

The drawings illustrate preferred forms and adaptations of the invention, however, it is to be understood that other modifications are contemplated, hence to meet existing conditions and the different requirements encountered various changes in the form, proportion and minor details within the scope of the invention as claimed, may be resorted to without departing from the nature thereof.

In the drawings—

Corresponding and like parts are referred to in the following description and indicated in the several views of the drawings by like reference characters.

Figures 1, 2:
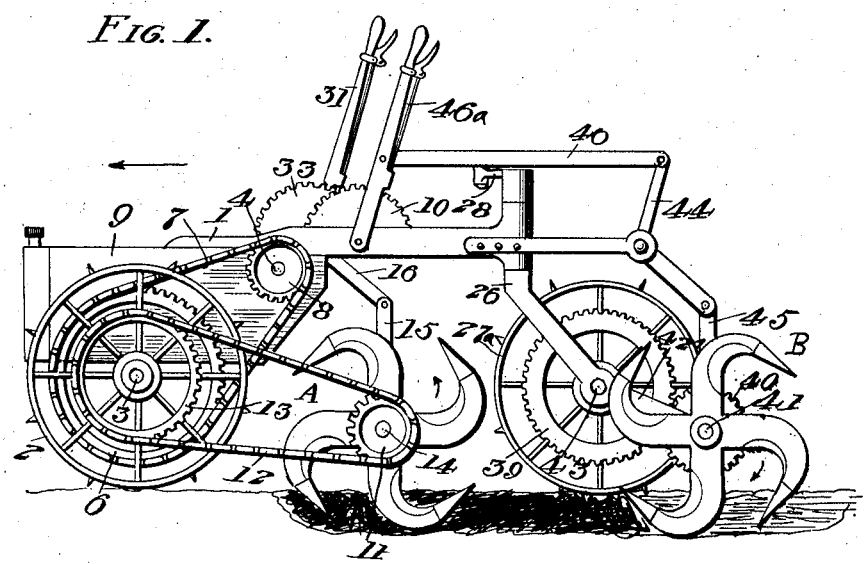
Figure 1 is a side view of the improved implement.
Fig. 2 is a perspective view of one of the units of the rotary propeller or earth treating member.

The invention contemplates a tractor which preferably consists of a light motor driven truck which may be of any design or construction and embody a motor of any type, preferably of the internal combustion variety.

In the embodiment of the invention shown in the drawings, the tractor comprises a body or main frame 1 which is supported upon supporting wheels 2, said supporting wheels being loosely mounted upon an axle 3 which is attached to the body 1 or other convenient part of the framework in any desired manner.

The supporting wheels 2 are suitably connected to a countershaft 4 which is transversely disposed with respect to the body 1 and includes a differential (not shown) and of any preferred type, whereby the two parts of the countershaft may be rotated at different relative speeds.

As shown, each of the supporting wheels 2 is provided with a gear 6 which is connected by means of a chain 7 with a spur pinion 8 attached to the outer end of each section of the countershaft. In this manner power is transmitted from the countershaft 4 to the supporting wheels.

The motor is arranged within the hood 9 and is connected with the countershaft 4 to operate the same. A caster frame 26 is journaled at the rear of the frame, and a caster wheel 27ª is arranged within the frame, to be turned thereby, to guide the implement. The wheel 27ª is provided with a spur gear 39 which is in mesh with the spur gear 40 fast to a shaft 41 which is the shaft of a rotary earth treating implement B.

Arms 42 connect the shaft 41 with the axle 43 of the wheel 27ª, thereby maintaining the relationship between the intermeshing spur gears 39 and 40 in any vertical adjustment of the shaft 41.

A bell crank 44 has one arm connected by links 45 with the shaft 41 and the remaining arm of the bell crank is connected by means of a rod 46 with an operating lever indicated at 46ª, arranged within convenient reach of the driver's seat so that the shaft 41 may be adjusted vertically as required. The bell crank lever is loosely pivoted to allow sufficient lateral swing of the caster frame. This lever 46ª is held in adjustment by means of latch mechanism engaging a toothed segment 10.

A second earth treating member A is arranged between the wheels 2 and the wheel 27ª, the said element having an axle 14 which carries a spur gear 11 connected by a chain 12 with a spur gear 13 on the axle 3. The shaft 14 is connected by links 15 with one of the arms 16 of a bell crank. The bell crank is pivoted on the frame 1 and the other arm has latch mechanism coöperating with a toothed segment 33 on the frame. The tractor frame 26 is controlled by suitable operating mechanism connected to the link 28 at the top of the frame.

The earth treating member B rotates in the opposite direction to the member A, the member B rotating clockwise while the member A rotates anti-clockwise. The member A pulverizes the soil and propels the machine over the field, while the member B pulverizes the soil and retards the forward movement of the machine. The implement or propeller B creates an opposing force acting on the propeller A, causing the said propeller to cut the soil to any desired depth. Thus this element acts as a brake or as a resistance to apply the opposing force needed to enable earth treating propeller on the shaft 14 to cut as deep or as shallow as circumstances may require.

Each of the propellers or earth treating members A and B consists of a series of units of the character shown in Fig. 2. Each of these units comprises a hub 23 and radial arms 24, the latter having their outer ends 25 curved or deflected in the same direction and tapering or pointed. These devices constitute rotary elements which are strung upon the shafts 14 and 41 and are properly spaced apart and connected to the said shafts in any manner so as to rotate therewith, creating a propelling force. It is proposed to arrange the rotary elements in a progressive series, that is, with the extremities or corresponding arms disposed one slightly in advance of the other so that the ends of the arms engage the soil in successive order from one end of the shaft to the other, thereby obtaining the best results.

From the foregoing taken in connection with the accompanying drawings, it will be understood that the invention provides an implement in which a relatively light motor of any type may be advantageously used both as the propelling means and as the driving means for operating any part to be operated such as the rotary devices A and B. As a tractor, the invention provides motive means for drawing any type of machine over the field, the tractor being of such design as to admit such machine to be conveniently hitched thereto.

In the construction shown the earth treating devices are also propelling devices, the wheels 2 being of light construction and being, in fact, supporting wheels and timing wheels that have a reversible action. At times the spikes in the rims of the wheels 2 push backward in order to force the shaft 14 to cut through hard ground, or to overcome increased resistance from the soil. This arrangement permits a large amount of weight to be dispensed with. As is known, a motor vehicle depends upon its weight for the propelling force, that is, the vehicle attains weight from gravity. In my construction I utilize the resistance of the soil, and transform it into useful force, tilling the soil and propelling the tractor with the same stroke. I use as little weight in the motor and carriage as possible, and the resistance of the soil is also utilized as brakes to regulate the speed of the machine. It is the purpose to create much greater power or force than is needed to propel the light machine with the rotating earth treating propellers; that the extra force may be applied back into the soil for use as brakes, instead of being used to push a heavy tractor over the ground. I provide the needed resistance to avoid excessive speed and to equalize the strong propelling force created through the rotating earth-treating propellers.

I claim:

1. In an implement of the character specified, a main frame, a supplemental frame pivotally connected with the main frame to have a caster effect, a tractor wheel mounted in the supplemental frame, a rotary earth treating propeller connected with the supplemental frame to turn therewith, and a gear connecting the rotary earth treating propeller with the tractor wheel.

2. In an implement of the character specified, a main frame, a supplemental frame pivoted to the main frame to have a caster effect, a tractor wheel mounted in the supplemental frame, a rotary earth treating propeller, connecting means between the rotary earth treating propeller and supplemental frame to admit of the earth treating propeller having vertical adjustment, gearing between the tractor wheel and rotary earth treating propeller, and means for adjusting the earth treating propeller vertically.

3. An implement of the character specified comprising a truck frame, supporting wheels for the frame, a motor supported by the frame, a plurality of rotary earth treating propellers supported by the frame, and driving connections between the motor, the wheels and the said propellers for turning the wheels and for turning the propellers and arranged to turn said propellers in opposite directions for the purpose specified, said propellers being vertically adjustable independently of each other.

4. An implement of the character specified comprising a frame, supporting wheels for the frame, a motor supported by the frame, a driving connection between the motor and the wheels, a rotary earth treating propeller supported by the frame and connected to the motor for constraining the said propeller to turn forwardly at a higher rate of speed than that of the forward movement of the frame, and means for braking the forward movement of the propeller to constrain the same to dig into the ground, said means comprising a rotating earth treating element supported by the frame, and a connection between the same and the wheels for turning said element in the opposite direction to the direction of movement of the propeller, said propellers being vertically adjustable independently of each other.

5. An implement of the character specified comprising a wheel supported frame, a motor supported by the frame, a rotary earth treating propeller supported by the frame and connected to the motor for turning the said propeller, and means for braking the forward movement of the propeller to constrain the same to dig into the ground, said means comprising a rotating earth treating element supported by the frame and connected to the wheels to turn in the opposite direction to the direction of movement of the propeller, said propellers being vertically adjustable independently of each other.

In testimony whereof I affix my signature in presence of two witnesses, this August 14, 1917.

LEMUEL A. GREENE. [L. S.]

Witnesses:
L. S. BOZEMAN,
E. D. ASBURY.